J. S. & T. B. Atterbury,
Making Glass Ware with Handles.
No. 3,116. Reissued Sep. 15, 1868.
Fig. 1.
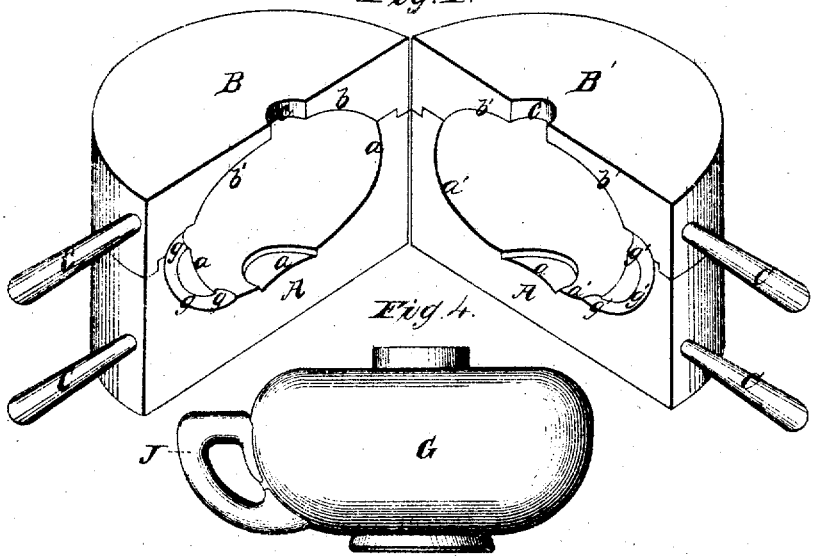
Fig. 4.
Fig. 2.
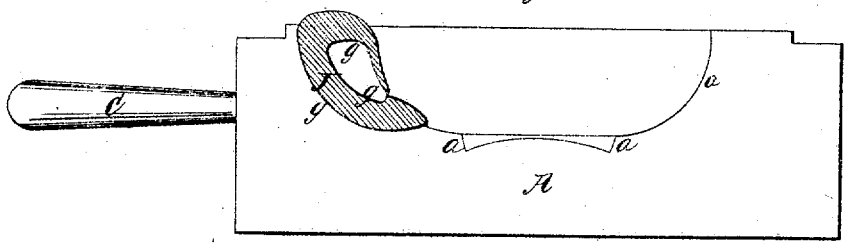
Fig. 3.
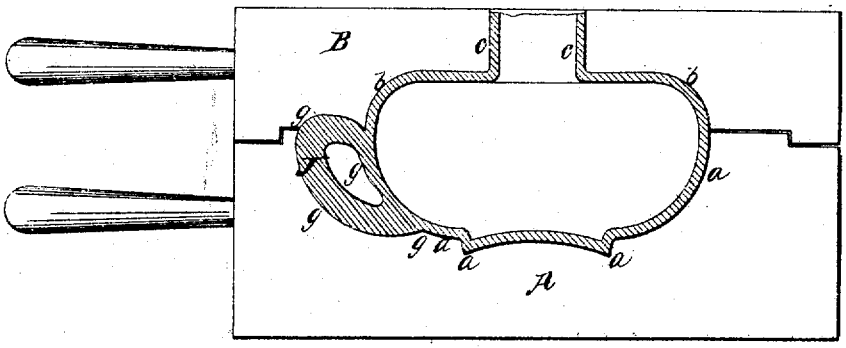
Inventors.
J. S. Atterbury
T. B. Atterbury
by Mason Fenwick & Lawrence Attys
Witnesses
R. T. Campbell
J. N. Campbell

UNITED STATES PATENT OFFICE.

J. S. ATTERBURY AND T. B. ATTERBURY, OF PITTSBURG, PENNSYLVANIA.

IMPROVEMENT IN MANUFACTURING GLASSWARE WITH HANDLES.

Specification forming part of Letters Patent No. 79,298, dated June 30, 1868; Reissue No. 3,116, dated September 15, 1868.

*To all whom it may concern:*

Be it known that we, J. S. ATTERBURY and T. B. ATTERBURY, of Pittsburg, in the county of Allegheny and State of Pennsylvania, have invented a new and useful Improvement in the Manufacture of Glassware; and we do hereby declare that the following is a full, clear, and exact description thereof, reference being had to the accompanying drawings, making a part of this specification, in which—

Figure 1 is a perspective view of molds which are adapted for the manufacture of hand-lamps with handles. Fig. 2 is a diametrical section through a lamp and its handle, with two of the half sections of the molds. Fig. 3 is a side view of the product of the molds shown in Fig. 1.

Similar letters of reference indicate corresponding parts in the several figures.

This invention relates to an improvement in the manufacture of glass lamps and other articles or vessels of glass requiring handles upon them. Under the old process of making such articles as we have above mentioned the work of shaping and applying handles is a separate operation from that of producing the bodies of the articles, and requires the experience of skillful workmen, who are guided by the eye and dexterity of their hands alone in the performance of this part of the work.

The object of our invention is to greatly facilitate and simplify the process of making lamps and other articles in glass requiring handles upon them, and at the same time to produce such articles in a more perfect manner than hitherto by providing for casting the handles in suitable molds previously to attaching them to the lamps or other articles, and also by providing suitable molds in which the bodies of the articles can be blown or produced and the previously-formed handles permanently attached to them, as will be hereinafter explained; also, by providing molds in which the body of the article which it is desired to make can be blown and the handle produced and attached permanently to it at successive operations in the same mold, as will be hereinafter explained.

To enable others skilled in the art to understand our invention, we will describe its construction and operation.

In the accompanying drawings we have represented one form of molds which are adapted for producing lamps and attaching the handles to them, and, from a description of these molds and the process of making the handles and bodies of the lamps it will be seen that other articles can be produced in the same manner and by the same process by simply changing the shape of the molds without departing from the principle of our invention.

A A′ represent two half-sections of the mold which are adapted for giving shape to the lower portions of the body and handle of the lamp. A and B B′ are two half-sections which are adapted for giving shape to the upper portions of the body of the lamp and its handle. The sections or halves A A′ are suitably hinged together and provided with handles C C, by which they can be opened and closed, and on top of these sections are elevations, which are adapted to receive corresponding recesses in the bottoms of the upper sections, B B′, as shown in Figs. 1 and 2, so that when the two sections forming the mold complete are put together they will be properly matched, and will be held in place. The upper halves, forming the upper sections of the mold, are suitably hinged together and provided with handles C C, like the lower halves of the mold, and through the center of this upper section a hole, *c*, is made, which produces the neck or rim of the lamp, as shown in Fig. 2.

In Figs. 1 and 2, *a a′*, *b b′*, and *c c′* represent the matrix in which the body of the lamp is produced, and *g g g g′ g′ g′* represent the matrix in which the handle of the lamp is produced. It will be seen that the matrix for the handle is in communication with the matrix of the body.

The operation of producing the lamps with handles upon them is as follows: We first close the two halves forming the lower section of the mold and introduce hot glass into the matrix *g g′*, which glass will flow to the bottom of the matrix. The workman during this last operation prepares his ball of glass, which is blown round and hollow, or nearly the shape of the body of the lamp. This ball is then introduced into the lower matrix, *a*, and the upper section of the mold adjusted in place over it, after which the workman blows and expands the glass in the mold, so that it will conform thereto, and at the same time attach itself firmly to the exposed heated glass handle which was previously formed in the matrix *g g*, thereby forming the body of the lamp and attaching its cast handle J to it at one operation. The mold is then opened and the finished lamp taken out for a repetition of the process.

The handle J, which is the first thing produced, is cast in the matrix made for it by dropping or inserting a piece of hot glass in said matrix, so that the glass will be more or less exposed beyond the lower opening of this matrix, then cutting off a sufficient length of the piece of glass above the matrix to form the upper part of the handle, which piece is pressed over so as to lie into the upper portion of the matrix with its end depressed. This forms the handle complete and ready to be attached to the body of the lamp or other article, as above described, and obviates the objections and labor required to produce glass handles by hand, as hitherto practiced in the manufacture of blown glassware.

Having described our invention, what we claim as new, and desire to secure by Letters Patent, is—

1. Producing handles for glass lamps and other glassware by casting them in molds ready to be attached to such articles, substantially as described.

2. The manner, substantially as described, of attaching glass handles to lamps or other articles of glass in the process of blowing such articles in a mold, substantially as described.

3. Guiding hot flexible glass as it drops or descends from the "punty" or pipe of the operator to the point of attachment on the bowl or other article by means of a mold which shapes the handle.

4. Dropping hot flexible glass into a mold for the purpose of forming a handle or handles for the bowl of a lamp or other vessel.

5. A glass lamp or other article in glass having a molded or cast handle and a blown body, produced substantially as described.

J. S. ATTERBURY.
T. B. ATTERBURY.

Witnesses:
WM. J. PATTERSON,
DAVID JENKINS.